United States Patent Office … 3,686,119
Patented Aug. 22, 1972

3,686,119
DRILLING COMPOSITION AND METHOD
Aaron E. Markham and Carl Adolphson, Bellingham, Wash., assignors to Georgia-Pacific Corporation, Portland, Oreg.
No Drawing. Filed Sept. 26, 1969, Ser. No. 861,498
Int. Cl. C10m *3/34, 3/48*
U.S. Cl. 252—8.5 C
17 Claims

ABSTRACT OF THE DISCLOSURE

A drilling composition comprising an aqueous dispersion of clayey material containing an effective dispersing amount of a lignosulfonate which has been subjected to phenolation and sulfonation to an extent sufficient to substantially improve the high temperature stability thereof, the product being a chromium salt. The method of the present invention comprises drilling a well using the aforesaid drilling fluid.

---

Water-base drilling fluids have long been widely used to drill subterranean wells such as oil and gas wells. These drilling fluids are often referred to as "drilling muds" because they comprise an aqueous dispersion of clayey material. Such dispersions are thixotropic and it was found that certain lignosulfonates improved the properties thereof and such lignosulfonates came to be called "thinners" since, among other things, they functioned to reduce the effective viscosity of the drilling fluid under drilling conditions. The history and function of such drilling fluids is described in more detail in U.S. Pat. 2,935,473, the disclosure of which is incorporated by reference herein. Pat. 2,935,473 discloses and claims a major innovation in lignosulfonate thinners, namely, the use of certain metal salts of lignosulfonates wherein the metals are chromium, aluminum, iron, copper or combinations thereof, which salts may or may not be oxidized; or by use of oxidized lignosulfonates. With the passage of time, the availability of oil or gas at readily accessible locations has diminished and it has become increasingly necessary to drill wells to ever-deeper levels. As the drilling depth increases, the temperature to which drilling fluids are subjected increases and it has been found that stability problems are encountered by reason of temperature induced deterioration of lignosulfonate drilling fluid thinners. Such difficulties can be overcome by adding increased amounts of thinner so as to replenish that which has been deteriorated, but this is, of course, an expensive and economically undesirable procedure. In some drilling operations, a water-base drilling fluid system may be used from the start of the drilling operation until a temperature of 250° F. or so is reached and then the drilling fluid is converted to the more difficult and costly oil-base system. Many continue drilling with the water-base system to 350° F. or even as high as 500° F. by making continual additions of the lignosulfonate additive to the drilling fluid to replenish the additive lost by temperature induced deterioration in order to maintain the desired rheological and fluid-loss properties.

It is, therefore, an object of this invention to provide a process of drilling a well with a water-base drilling fluid at elevated temperatures. A further object is to provide a water-base drilling fluid composition with improved thermal stability. A still further object is to provide a drilling fluid composition which will continue at elevated temperatures to have the effectiveness and good attributes of the presently used fluids at lower temperatures.

The above and other objects are attained, according to this invention, by drilling a well at temperatures above 250° F. with a drilling fluid composition comprising an effective dispersing amount of a water-soluble sulfonated, phenolated-lignosulfonate. The phenolated-lignosulfonate is sulfonated with a hexavalent sulfur sulfonating agent, such as sulfuric acid, sulfur trioxide, or mixtures and compounds thereof. Chromium metal salts of the sulfonated, phenolated-lignosulfonate or salts containing a mixture of chromium and other metals may be used. Drilling fluids containing the sulfonated, phenolated-lignosulfonate additives have improved thermal stability and may be satisfactorily used in drilling operations at temperatures of at least about 100° F. to 150° F. higher than the presently used additives in the water-base system. Since a temperature rise of from one to two degrees Fahrenheit for every hundred feet of increased depth drilled is generally encountered, the water-base system containing the additive may thus be used satisfactorily up to the completion of most of the deep wells being presently drilled.

Lignosulfonates or sulfonated lignin-containing materials, comprising mainly sulfonated products of lignin or lignocellulosic materials, obtained from any source, may be used in the preparation of the additives for the drilling fluid compositions. Lignin is a polymeric substance of phenylpropane-type structural units linked in various ways and found in plant and vegetable tissue associated with cellulose and other plant constituents. While there is some variation in the chemical structure of lignin and of other constituents found in different plants, depending upon the type of plant, place where it is grown, and also upon the method used in recovery or isolation of the particular constituents from the plant tissue, the basic structure and properties of these materials upon sulfonation are similar and form the well-known group of materials referred to as "lignosulfonates."

One of the main sources of lignosulfonates or sulfonated lignin is the residual pulping liquors obtained in the pulp and paper industry where lignocellulosic material such as wood, straw, corn stalks, bagasse, and the like are processed to separate the cellulose or pulp from the lignin. The lignin is usually the by-product. In sulfite pulping, lignocellulosic material is digested with a sulfite or bisulfite; the resulting residue being a sulfonated pulping liquor commonly referred to as "spent sulfite liquor" containing the sulfonated lignin products. In other pulping processes, the residual pulping liquor as obtained from the process may not be a sulfonated product. However, the residual liquor or products containing the lignin portion of the lignocellulosic materials from the sulfite or other processes may be treated by various known methods to sulfonate the product to the degree desired. For example, the residual liquor obtained in an alkaline pulping process such as kraft, soda, or other alkaline processes, may be sulfonated to obtain a sulfonated residual pulping liquor useful in the preparation of the compositions of the present invention. Likewise, other lignins can be sulfonated to soluble products and used.

The sulfonated lignin products from the sulfite pulping process or obtained by the sulfonation of other residual pulping liquors or lignin-containing materials may contain other constituents besides sulfonated lignin. The products may contain carbohydartes, degradation products of carbohydrates, and resinous materials as well as other organic and inorganic constituents. Although these non-lignin materials may be removed or the lignosulfonate portion may be recovered from the liquor, it is not necessary to do so. Some of the non-lignin constituents, such as carbohydrates, may react with the reactants during the phenolation and sulfonation reactions to form products which may not necessarily be detrimental.

In addition to the purification of the sulfonated lignin products, the sulfonated residual liquor, such as spent sulfite liquor or sulfonated lignin, may be subjected to various pretreatments, such as, for example, acid, alkaline, or heat treatments as well as reaction with other chemicals or oxidation to remove or modify some of the constituents or for other purposes. The lignin constituents may be affected to a certain extent by such treatments and the treatment may be beneficial as long as it is not so severe as to destroy the polymeric nature of the lignin. For example, the halogenation of a sulfonated lignin product, such as sepnt sulfite liquor, with chlorine will generally have a beneficial effect. Thus, the terms "lignosulfonate" and "sulfonated lignin" as used herein and commonly in the field, include the product subjected to these various treatments as long as the product retains the basic properties and characteristics associated with the untreated products.

Illustrative examples of the phenols which may be used are phenol, cresols, xylenols, resorcinol, catechol, hydroquinone, and naphthol, also chlorinated phenols may be used. The monohydric phenols are preferred.

The various known methods for the interaction of phenol with lignosulfonates may be used in the phenolation of the lignosulfonate. The reaction may be carried out by simply intermixing or dissolving the lignosulfonate product in the dry form in the phenol. The reaction may also be carried out in a liquid medium or solvent in which at least one of the reactants is soluble. An aqueous medium is commonly used, since lignosulfonates and many of the phenols are soluble in water. However, organic solvents may also be employed. For example, aliphatic hydrocarbon solvents, especially the halogenated hydrocarbons, for from 1 to 4 carbon atoms, dioxane, nitromethane, and dimethylsulfoxides are illustrative of the solvents which may be used. The lower aliphatic alcohols, such as alcohols having from 1 to 4 carbon atoms, lower aliphatic organic acids of from 1 to 4 carbon atoms, and glycols may also be employed. When organic solvents such as organic acids or alcohols are used to aid in dissolving the lignosulfonate and phenol, generally the amount used is minimized with amounts of from 5 to 20 weight percent of the lignosulfonate solids being used. An excess is avoided so that the solvent does not have to be recovered.

The phenolation may be effected under either alkaline or acid conditions. Also, at times it may be desirable to effect the reaction with the lignosulfonate or the sulfonated lignin product being de-ashed or in the acid form. The reaction temperature employed may be widely varied depending mainly upon the particular process and phenol used in the phenolation. While the reaction may proceed at a significant rate at room temperature and lower, generally, the reaction mixture is heated for from ¼ to 6 hours at a temperature in the range of 80° C. to 180° C. to obtain a more rapid rate and greater amount of interaction between the lignosulfonate and the phenol.

The interaction of just a small amount of phenol with the lignosulfonate imparts some beneficial effect toward improved thermal stability. However, for practical purposes, generally, at least 5 weight percent of phenol, based upon the lignosulfonate solids, is condensed with the lignosulfonate product. A product having from 10 to 25 weight percent, based upon the lignosulfonate product solids, of the interacted phenol is preferred. Usually the reaction is carried out by intermixing the lignosulfonate with from 20 to 60 weight percent of phenol, based upon the lignosulfonate product solids. The reaction may not go to completion and a considerable portion of the phenol may remain unreacted. The excess phenol may be removed or recovered for reuse by extraction with a suitable solvent, vacuum distillation, or other means. Unless excessive amounts of phenol are used, it does not have to be removed. It becomes sulfonated and may remain in the final product. The presence of a limited amount of unreacted phenol improves the solubility of the reaction mixture in liquid sulfonating agents such as sulfuric acid and the like and thus aids in the sulfonation.

Hexavalent sulfur sulfonating agents, such as, for example, sulfuric acid, sulfur trioxide, chlorosulfonic acid, and mixtures thereof, are employed in sulfonating the phenolated-lignosulfonate. The sulfonation may be carried out with the phenolated-lignosulfonate being in a liquid medium or in dry form. Usually a decrease in the sulfonate sulfur content is obtained upon the phenolation of the lignosulfonate. This decrease is partially due to the increase in weight obtained by the condensation of the phenol with the lignosulfonate. However, some desulfonation may also occur during the phenolation. In the sulfonation step, it is believed that the more reactive sites of the phenolated-lignosulfonate are sulfonated improving the stability of the product. Thus, only a thorough contact or intermixing with the hexavalent sulfur sulfonating agent may be sufficient to improve the thermal stability of the product and obtain sufficient sulfonation.

It is generally preferred to effect the sulfonation to obtain at least a 25 percent increase of the sulfonate sulfur content over the sulfonate sulfur content prior to sulfonation. Usually the final product has from 5 to 15 weight percent of sulfonate sulfur with products having from 8 to 12 percent being preferred.

In effecting the sulfonation in an aqueous medium, the sulfonating agents are used in a concentrated form to effect the sulfonation without undue condensation of the phenolated-lignosulfonate product. Under acid conditions, the product may be condenssed to the extent that it becomes water insoluble. Thus, when effecting the sulfonation with sulfuric acid, concentrated sulfuric acid is employed such as, for example, 96 percent acid or fuming acid. The sulfonating mixture is preferably maintained at an acid concentration of at least 80 percent. Generally, it is more convenient to sulfonate the phenolated-lignosulfonate with the phenolated-lignosulfonate being in a solid form. The phenolated-lignosulfonate may be intermixed in the sulfonating agent or intermixed with the sulfonating agent in a fluidized bed. The phenolated-lignosulfonate is generally soluble in concentrated sulfuric acid and may thus be readily sulfonated by being intermixed in the acid. Also, the phenolated-lignosulfonate may be dispersed or dissolved in a non-aqueous medium, for example, sulfur dioxide or an organic medium, and then contacted with sulfuric acid, sulfur trioxide, or other sulfonating agents to effect the sulfonation. Likewise, the sulfonation may be carried out in the dry state by employing fluid-bed techniques.

Generally, the phenolated lignosulfonate is contacted with the sulfonating agent at room temperature. However, the sulfonation may be carried out at a lower temperature, such as 0° C. or lower. The reaction temperature of the mixture is usually maintained below 110° C. to prevent charring of the product. In a fluid-bed technique where the reaction can be more readily controlled, for example, by diluting the sulfonating agent with a diluent, a higher temperature may be employed; but the higher temperature is generally unnecessary, since the reaction is rapid and may be effected at lower temperatures. While the sulfonation may be effected by merely contacting or intermixing the reactants, a short reaction time of about five minutes or up to four hours or longer may be employed to insure a substantial completion of the sulfonation reaction.

At times, it may be convenient to effect the phenolation and sulfonation in a one-step operation. For example, the sulfonated lignin product may be phenolated and sulfonated by intermixing the sulfonated lignin with phenol and adding sulfuric acid to effect the phenolation and sulfonation.

The present invention comprehends the use of chromium and mixtures of chromium and other metals such as iron, copper or aluminum to improve the thinning properties as well as the thermal stability of the product. Thus, as used herein, the term chromium salt includes salts in which chromium is present alone or in combination with another metal. The various known methods may be used for the conversion of the product to the above-described chromium salt. The methods used for the conversion of lignosulfonate products to the chromium lignosulfonate salts are applicable. The conversion to the salt may be conveniently carried out in an aqueous medium by intermixing a soluble compound of the chromium with the sulfonated, phenolated-lignosulfonate product in water. Water-soluble salts and compounds of chromium alone or together with iron, copper, or aluminum, such as sulfates, nitrates, chlorides, oxides, hydroxides, and other soluble salts as well as organic salts such as acetates may be used. The chromium may also be added as a chromate in which case it will have an oxidizing effect upon the lignosulfonate as well as contribute the chromium metal ion. The reaction may be carried out at room temperature or at an elevated temperature for a short period of time of from about five to ten minutes or as long as 24 hours or longer. Usually the mixture is heated in a range of 70° C. to 100° C. for from one half to two hours. The interaction is generally effected under acid conditions but after reaction the reaction mixture may be neutralized to a pH in the range of 2 to 4 prior to drying, for the protection of the equipment. The product may also be prepared by the phenolation and sulfonation of a chromium salt of lignosulfonate or by the conversion of the lignosulfonate intermediate reaction product to the chromium salt during the processing. Some variation in drilling mud properties may be obtained by varying the order of the salt formation step.

When the water-soluble compounds of chromium alone or together with iron, aluminum, and/or copper are intermixed with the sulfonated, phenolated-lignosulfonate product, the actual mechanism of the interaction between the metal and the sulfonated, phenolated-lignosulfonate product obtained is not definitely known. There are indications that some type of a complex salt may be formed differing somewhat from a simple salt. Thus, the term "salt," as used herein, means the metal reaction product obtained regardless of the nature of the bond between the metal and the sulfonated, phenolated-lignosulfonate.

The drilling fluid composiitons using the sulfonated, phenolated-lignosulfonate additives are prepared and used in a manner similar to that used for known lignosulfonate containing drilling fluids. The amount of added to the mud likewise may be widely varied as for the lignosulfonate additives. An amount of from one quarter to 40 pounds per barrel of mud may be used depending upon the particular drilling situation. While the drilling fluids containing the sulfonated, phenolated-lignosulfonate are effective in drilling operations at temperatures above 250° F., they may be used from the start of the drilling operation until the completion of the well. The amount of additive employed in the drilling fluid is increased somewhat at the higher temperatures and often will be in the range of from six to 20 pounds per barrel, most often in the range of from eight to 15 pounds per barrel. Additional amounts of the additive may be periodically added as the need is indicated.

The following examples further illustrate the invention.

EXAMPLE I

A sample of a fermented calcium base liquor was acidified with sulfuric acid in a sufficient amount to precipitate the calcium as calcium sulfate, which was removed by centrifuging to yield a clarified, essentially de-ashed lignosulfonic acid solution having a solids concentration of about 40 weight percent. This material was intermixed with phenol in an amount of about 45 weight percent, based upon the solids content of the lignosulfonic acid solution. The mixture was then heated for four hours at 130° C. after which the pH was adjusted to 3 with a sodium hydroxide solution and spray-dried.

One portion of the spray-dried, phenolated-lignosulfonate in an amount of 500 grams was sulfonated by mixing it with 463 milliliters of a 96 percent sulfuric acid solution. The mixture was heated for about 90 minutes at 80° C. It was then dissolved in water and neutralized with a lime slurry. An iron and chromium salt of the product was prepared by adding to the resulting solution, ferric sulfate and sodium dichromate in an amount of about 1.25 percent of iron and eight percent of chromium, based upon the solids content of the phenolated-lignosulfonate. The resulting mixture was digested for about one hour at 90° C., clarified, and then dried. A drilling fluid composition was prepared using the product and tested for high temperature stability. The product had a sulfonate sulfur content of 7.6 weight percent.

The thermal stability test was made by determining the rheological properties of a weighted drilling composition containing the additive after the drilling fluid had been subjected to a high temperature for 22 hours. The drilling fluid composition was prepared from a base mud obtained by intermixing a Wyoming bentonite and a low-yield Texas bentonite with water to obtain a mixture containing about eight percent clay. The ratio of the low-yield clay (45 barrels of 15 centipoises per ton) to the Wyoming bentonite was about 6:1. Small amounts of sodium carbonate and sodium chloride were added and the mixture mixed for about 25 to 30 hours until a substantially constant viscosity was obtained. The base mud with 11 pounds per barrel of additive based upon the weighted drilling fluid, was then adjusted to pH 9.5 with sodium hydroxide and hot rolled at 150° F. for 20 hours. The drilling fluid was then weighted with barium sulfate to obtain a 16 pound per gallon mud and again hot rolled at 150° F. for 20 hours after adjusting to pH 9.5. The weighted, hot-rolled drilling fluid was heated at a starting pH of 9.5 in a sealed autoclave for 22 hours in a 475° F. oven without mixing. The drilling fluid so heated was allowed to cool to room temperature, mixed for 20 minutes, and then the rheological properties tested. Viscosity, gel-strength, and filtration tests according to API recommended standard procedures were made. A shear of gel obtained after heating for 22 hours was also determined prior to mixing of the cooled drilling fluid for the API tests.

A test was also made by the use of a Fann Consistometer which determines the time required at a particular high temperature and pressure to obtain sufficient thickening or gelation such that a predetermined magnetic force is unable to move a special soft iron bob through the fluid in a cell. The "gel time" was determined by rapidly heating the drilling fluid to 500° F., in about one hour, and noting the time it took for the hot rolled, weighted drilling fluid to thicken at this temperature under 10,000 pounds per square inch pressure.

The results are shown in the table. The shear and the weighted drilling mud tests were compared to the results obtained with an additive prepared from a lignosulfonate phenolated in a manner similar to that above but without sulfonation. The phenolated lignosulfonate additive was converted to an iron-chromium salt in a manner similar to that described above by adding ferric sulfate and sodium dichromate in an amount of about 1.25 percent iron and eight percent chromium, based upon the solids content of the phenolated lignosulfonate. The sulfonate sulfur content was 2.7 weight percent.

| Additive | Consistometer, hours at 500° F. before gelation | Shear, lbs./100 sq. ft. | Initial gel | Plastic viscosity | Yield | 10 min. gel | Water loss |
|---|---|---|---|---|---|---|---|
| Fe and Cr salt of sulfonated phenolated lignosulfonate | 9½ | 298 | 2.0 | 48.0 | 4.0 | 10.0 | 6.9 |
| Fe and Cr salt of phenolated lignosulfonate | | 5,000 | 2.0 | Too thick to test | | | |

EXAMPLE II

To 3600 grams of a fermented calcium base spent sulfite liquor solution containing 1500 grams of solids, 300 grams of a 50 percent sulfuric acid solution were added. The resulting calcium sulfate obtained upon the addition of sulfuric acid was removed by centrifuging. Cresylic acid in an amount of 450 grams was added to the clarified solution and the resulting mixture heated at a temperature of about 140° C. for two hours. The product obtained was diluted with water and the pH adjusted to about 5 by the addition of sodium hydroxide. The product was then spray-dried.

The phenolated lignosulfonate so obtained was sulfonated by the addition of the spray-dried powder to concentrated sulfuric acid. To 900 milliliters of 96 percent sulfuric acid, 450 grams of the phenolated material were gradually added with stirring. After the phenolated lignosulfonate was intermixed with the sulfuric acid, the resulting mixture was placed in a hot water bath at 80° C. for two hours. The reaction mixture was then diluted with cold water, neutralized with lime, filtered to remove the calcium sulfate, and spray-dried. The product had a sulfonate sulfur content of 9.3 percent.

Two portions of the sulfonated phenolated lignosulfonate were dissolved in water and reacted with different amounts of chromium sulfate to convert the sulfonated, phenolated lignosulfonate to chromium salts. After digesting the chromium sulfate-containing mixture for one hour at 80° C., the pH was adjusted to 3 to 4 and the product spray-dried. One of the products prepared contained 3.3 weight percent chromium and the second 5.5 percent.

The products thus obtained were evaluated as high temperature drilling fluid additives by the procedure described in Example I. The shear obtained was 178 pounds per 100 square feet for the product containing 3.3 percent chromium and 201 pounds per 100 square feet for the product with 5.5 percent chromium. It required 4¾ hours at 500° F. for the drilling fluid containing the additive with 3.3 percent chromium to gel in the consistometer and 9¾ hours for the additive with 5.5 percent chromium.

In addition to running the API mud tests for the additive after heating for 22 hours at 475° F., the additive was tested as a gyp mud thinner prior to heating. In making the gyp mud test, 6 pounds per barrel of additive, 6 pounds per barrel of plaster of paris, and a sufficient amount of a 25 percent sodium hydroxide solution to adjust the mixture to pH 8.2 were added to the base mud and mixed for 20 minutes on a Hamilton Beach mixer. The mud was then hot rolled at 150° F. for 20 hours, cooled and tested according to the API standards. The results obtained are shown in the table below:

MUD TESTS

| Additive, percent Cr | Initial gel, lbs./100 sq. ft. | Plastic viscosity, centipoises | Yield, lbs./100 sq. ft. | 10 min. gel, lbs./100 sq. ft. | Water loss, mls. |
|---|---|---|---|---|---|
| Weighted mud after 22 hours at 475° F., 11#/bbl. additive | | | | | |
| 3.3 | 2.5 | 47.5 | 9.5 | 9.5 | 6.2 |
| 5.5 | 3.5 | 48.0 | 11.0 | 22.0 | 7.3 |
| Gyp mud, after hot rolling, 6/#bbl. of additive | | | | | |
| 3.3 | 4.0 | 5.5 | 4.0 | 7.0 | 13.2 |
| 5.5 | 9.0 | 5.5 | 11.0 | 15.5 | 15.1 |

EXAMPLE III

To 60 grams of molten phenol, 120 grams of a spray-dried, fermented calcium base spent sulfite liquor were slowly added and mixed into the phenol. Sulfuric acid in an amount of 14 grams was added as a catalyst. The mixture was digested for 3½ hours at a temperature in the range of 90° C. to 100° C. with frequent stirring after which additional 96 percent sulfuric acid was added in an amount of 140 grams. The mixture was then slowly stirred and maintained at 90° C. for about two hours. The product was then neutralized to a pH of about 6.5 by the addition of a lime slurry. Upon analysis, it was found that the product contained about 9.2 percent sulfonate sulfur.

A portion of the sulfonated, phenolated lignosulfonate was diluted to obtain a solution containing 12 weight percent of solids and converted to the chromium salt. To 400 grams of this solution, chromium sulfate was added in an amount to give about four percent chromium based upon the solids content of the sulfonated, phenolated lignosulfonate. The product was digested for one hour at 80° C. after which a 25 percent solution of sodium dichromate was added in an amount equivalent to about two percent chromium. The mixture was stirred and reacted for one hour at 80° C. after which it was neutralized to a pH of about 3.3 with sodium hydroxide and spray dried.

The product thus obtained was evaluated as a high temperature drilling fluid additive by the procedure described in Example II except that the shear and the API tests were made upon heating the material for 22 hours at a temperature of 425° F. instead of 475° F. The shear obtained was 214 pounds per 100 square feet and after 6½ hours of heating the drilling fluid at 500° F. in the consistometer it had not gelled. Prior to weighting and heating the mud to the high temperature, gyp mud tests were also made.

The results obtained in the API tests are shown in the table below:

MUD TESTS

| | Initial gel | Plastic viscosity | Yield | 10 min. gel | Water loss |
|---|---|---|---|---|---|
| Weighted mud after 22 hours at 425° F., 11#/bbl. additive | 1.5 | 41.5 | 6.5 | 4.5 | 10.4 |
| Gyp mud tests after hot roll, 6#/bbl. additive | 13.5 | 4.5 | 21.5 | 21.5 | 18.8 |

EXAMPLE IV

A fermented calcium base liquor was treated with sulfuric acid to precipitate the calcium and spray-dried after the removal of the precipitated calcium sulfate. To 500 grams of molten phenol, 500 grams of the dry calcium-free spent sulfite liquor solids were added and the mixture stirred for four hours at 105° C. The unreacted or excess phenol and the water solubles were removed by vacuum distillation and water washing. Approximately 75 percent of the starting phenol was recovered. The water-insoluble phenolated lignosulfonate thus obtained was reacted with 96 percent sulfuric acid in an amount of 1.5 parts of the acid per one part of the phenolated lignosulfonate by weight. The sulfonation reaction was effected at about 100° C. for three hours. The reaction mixture was then neutralized with a calcium hydroxide slurry and the precipitated calcium sulfate removed by filtration. The product was dried. It contained 11.4 percent sulfonate sulfur.

The sulfonated, phenolated lignosulfonate was converted to the chromium salt by the reaction of the sulfonated, phenolated lignosulfonate with chromium sulfate to obtain a product which contained about 6.5 percent chromium. The reaction mixture was heated for one hour at 80° C. and then neutralized with sodium hydroxide to a pH of about 3 to 4, filtered, and spray dried. The product thus obtained was evaluated as a gyp mud and as a high temperature drilling fluid additive by the procedures described in Example III except that the high temperature shear and the API tests were made after the material had been heated for 22 hours at 450° F. instead of 425° F.

The shear after heat treatment of 450° F. for 22 hours was 164 pounds per 100 square feet and it took 9¾ hours for the drilling fluid to gel in the consistometer at 500° F. The results of the gyp mud and weighted mud tests are as follows:

MUD TESTS

| | Initial gel | Plastic viscosity | Yield | 10 min. gel | Water loss |
|---|---|---|---|---|---|
| Weighted mud after 22 hours at 450° F., 11#/bbl. additive | 1.5 | 41.5 | 1.5 | 3.5 | 9.6 |
| Gyp mud tests after hot roll, 6#/bbl. additive | 9.5 | 5.0 | 11.5 | 14.5 | 17.2 |

EXAMPLE V

A chromium salt of a sulfonated, phenolated, chlorinated, lignosulfonate was prepared and tested for high temperature stability as a drilling fluid additive.

A concentrated, fermented calcium base spent sulfite liquor containing about 40 percent solids was chlorinated by the passage of chlorine gas into the solution until a weight increase of approximately 38.5 weight percent, based upon the spent sulfite liquor solids, was obtained. The chlorinated lignosulfonate which precipitated was recovered by filtration and washed with dilute hydrochloric acid and dried. The chlorolignosulfonate was intermixed with molten phenol in an amount of 100 grams of the chlorolignosulfonate and 50 grams of phenol. The mixture obtained was mixed and heated in a boiling water bath for 80 minutes after which time 100 grams of 96 percent sulfuric acid were added and the mixture was heated for an additional one hour. The product was neutralized to a pH of 8 by the addition of calcium hydroxide. A chromium sulfate solution was added to the neutralized mixture to convert the product to the chromium salt. The pH was adjusted to 3.5 with a sulfuric acid solution and the mixture was heated for one hour on a boiling water bath. After sitting overnight, the mixture was readjusted to a pH of 3.5 and further heated for 30 minutes prior to clarification by centrifuging. The clarified liquor was spray-dried and upon analysis was found to contain about 10.3 percent sulfonate sulfur, 4.5 percent organic chlorine, and about 2 percent chromium.

In testing the product as a high temperature drilling mud, it was found that the drilling fluid containing the additive had a shear of 103 pounds per 100 square feet after being heated for 22 hours at 425° F. The drilling fluid operated in the consistometer at 500° F. for over 15 hours prior to gelling. The results of the gyp mud and the weighted mud tests are shown in the table below:

MUD TESTS

| | Initial gel | Plastic viscosity | Yield | 10 min. gel | Water loss |
|---|---|---|---|---|---|
| Weighted mud after 22 hours at 425° F., 11#/bbl. additive | 3.5 | 20.5 | 9.5 | 32.5 | 17.5 |
| Gyp mud tests after hot roll, 6#/bbl. additive | 8.0 | 6.0 | 15.0 | 12.5 | 24.9 |

EXAMPLE VI

A high temperature drilling fluid additive was prepared from a lignosulfonate which was phenolated under alkaline conditions.

A fermented spent sulfite liquor was fractionated by dialysis to recover approximately 80 percent of the total lignosulfonate in a fraction containing about 60 percent lignosulfonate solids. The dialyzed lignosulfonate, in the amount of one part, was intermixed with two parts of phenol, 0.375 part of sodium hydroxide, and 4.5 parts of water. The solution was heated at 170° C. for two hours after which it was neutralized with a cation exchange resin in the acid form and vacuum evaporated and solvent extracted with methylene chloride to remove the excess unreacted phenol. The phenolated lignosulfonate was dried and then sulfonated with 96 percent sulfuric acid. The product thus prepared was converted to a chromium salt containing approximately 3.7 percent chromium by the reaction with chromium sulfate in an aqueous solution. The final product had a sulfonate sulfur content of 8.3 weight percent.

Upon testing the above product as a drilling mud additive in a manner similar to that described above, it was found that the shear, after heating for 22 hours at 425° F., was 113 pounds per 100 square feet. The drilling fluid had to be heated for four hours in the consistometer at 500° F. before gelling.

The results of the API tests are shown in the table below:

MUD TESTS

| | Initial gel | Plastic viscosity | Yield | 10 min. gel | Water loss |
|---|---|---|---|---|---|
| Weighted mud after 22 hours at 425° F., 11#/bbl. additive | 2.0 | 43.0 | 5.5 | 6.5 | 8.3 |
| Gyp mud tests after hot roll, 6#/bbl. additive | 0.5 | 5.0 | 2.0 | 4.5 | 11.2 |

EXAMPLE VII

A chromium-iron lignosulfonate salt was phenolated and sulfonated.

In the preparation of the chromium-iron lignosulfonate salt, a fermented calcium base spent sulfite liquor was alkaline treated by being maintained at 100° C. for from 14 to 16 hours at a pH of around 8 after which ferric sulfate in an amount to give about 3 percent of iron on the final product was added. The chromium was added as sodium dichromate in an amount to obtain about 2.8 percent chromium on the final product. The resulting chromium-iron lignosulfonate salt solution was spray dried. The spray-dried powder was then phenolated by intermixing the dried lignosulfonate salt with 10 percent acetic acid and 30 percent of phenol. Sulfuric acid of 96 weight percent concentration was then added to the mixture in an amount of 184 weight percent, based upon the dry chrome-iron lignosulfonate salt. The acid-containing mixture was heated for about 90 minutes at 80° C. after which it was diluted with water and neutralized to about a pH 3.5 with calcium hydroxide and spray-dried.

The final product and the chromium-iron lignosulfonate salt prior to phenolation and sulfonation were tested as drilling mud additives in a manner described above. The results obtained are shown in the table below:

The products thus prepared were tested as drilling mud additives in a weighted mud in the manner similar to that

| Additive | Shear, lbs/100 sq. ft. | Initial gel | Plastic viscosity | Yield | 10 min. gel. | Water loss |
|---|---|---|---|---|---|---|
| | | | Weighted mud after 22 hours at 475° F., 11 #/bbl. additive | | | |
| Cr Fe lignosulfonate salt phenolated and sulfonated | 406 | 4.0 | 38.0 | 14.0 | 35.0 | 7.8 |
| Cr Fe lignosulfonate salt | 2,600 | | Too thick to test | | | |
| | | | Gyp mud after hot roll, 6 #/bbl. additive | | | |
| Cr Fe lignosulfonate salt phenolated and sulfonated | | 1.0 | 7.0 | 2.0 | 5.0 | 11.6 |
| Cr Fe lignosulfonate salt | | 1.5 | 7.5 | 3.0 | 9.5 | 9.4 |
| | | | Sea water mud after hot roll, 5 #/bbl. additive | | | |
| Cr Fe lignosulfonate salt phenolated and sulfonated | | 1.5 | 8.0 | 4.0 | 16.5 | 20.2 |
| Cr Fe lignosulfonate salt | | 2.5 | 8.5 | 6.0 | 13.5 | 16.5 |

EXAMPLE VIII

A chromium salt of a sulfonated phenolated-lignosulfonate was prepared in which the lignosulfonate was phenolated and sulfonated in an organic solvent.

A fermented calcium base spent sulfite liquor having about 40 percent solids concentration was de-ashed by the addition of sulfuric acid to precipitate the calcium as calcium sulfate. The de-ashed liquor was centrifuged to remove the calcium sulfate and spray-dried. The spray-dried product in an amount of 100 grams was dispersed in 350 grams of chloroform in which 10 grams of phenol had been dissolved. The mixture was heated under reflux for one hour after which 100 milliliters of 96 percent sulfuric acid were added and the resulting mixture was refluxed for an additional hour. To the reaction mixture, 1000 milliliters of water were then added and the pH was adjusted to about 7.5 by the addition of lime slurry. A major portion of the cloroform was distilled off and the portion which remained was decanted. To the remaining aqueous solution a chromium sulfate solution was added in an amount of about 5 percent chromium, based upon the calcium-free spent sulfite liquor solids. The chromium sulfate treated product was digested in a boiling water bath for one hour after which it was filtered and the filtrate was spray dried.

The above run was repeated except that instead of using 10 percent phenol, based upon the de-ashed spent sulfite liquor powder, 20 percent phenol was used by dissolving 20 grams of phenol in the 350 grams of chloroform instead of 10 grams.

A third run was also made similar to that described above except that instead of using de-ashed spent sulfite liquor solids, 100 grams of a sodium lignosulfonate salt were used. The sodium lignosulfonate was obtained by converting a fermented calcium base spent sulfite liquor to the sodium salt form by the addition of about a stoichiometric amount of sodium sulfate to be spent sulfite liquor to convert the product to the sodium salt form and precipitate the calcium as calcium sulfate. The amount of phenol used in the reaction was also increased to 40 percent by dissolving 40 grams in the chloroform prior to the addition of the lignosulfonate.

The products thus prepared were tested as drilling mud additives in a weighted mud in the manner similar to that described above. The results obtained are shown in the table below:

| Additive, percent phenol added | Shear, pounds per 100 sq. ft. | Initial gel | Weighted mud after 22 hours at 475° F., 11#/bbl. additive | | | |
|---|---|---|---|---|---|---|
| | | | Initial viscosity | Yield | 10 min. gel | Water loss |
| 10 | 690 | 20 | 43 | 31 | 85 | 11.3 |
| 20 | 440 | 3 | 43 | 10 | 9 | 6.8 |
| 40 | 386 | 3 | 34 | 23 | 19 | 10.3 |

EXAMPLE IX

A chromium-iron lignosulfonate was prepare by reacting a fermented, calcium base spent sulfite liquor with sodium dichromate, chromium sulfate, and iron sulfate. The product contained about 1 percent iron and about 3.2 percent chromium, half of which was added as sodium dichromate and the other half as dichromate reduced to chromium sulfate. The product was spray-dried and samples of the product were used for reaction with resorcinol.

The chromium-iron lignosulfonate in an amount of 100 grams was intermixed with 25 grams of resorcinol in a blender. The mixture was then dissolved in 230 grams of 96 percent sulfuric acid and heated for 75 minutes in a 95° C. water bath, after which 400 milliliters of water were added and the pH was adjusted to 2 by the addition of a lime slurry. The mixture was filtered to remove the calcium sulfate and the clarified liquor was reacted with additional chromium sulfate, obtained by reducing dichromate with spent sulfite liquor, by heating for 1 hour at pH 2 in a 90° C. bath. Substantially all of the calcium remaining in the mixture was precipitated by addition of sodium sulfate. After filtration to remove the calcium sulfate, the product was adjusted to a pH 3 by addition of a sodium hydroxide solution and spray-dried. The dried product contained 9.7 percent sulfonate sulfur, 2.5 percent chromium, and about 0.9 percent iron.

A second product was prepared by the reaction of the chromium-iron lignosulfonate with resorcinol in the manner described above except that 45 grams of resorcinol was intermixed with 100 grams of the chromium-iron lignosulfonate and the resulting mixture was sulfonated with 265 grams of 96 percent sulfuric acid. The product contained 9.9 percent sulfonate sulfur, 2.6 percent chromium, and 0.7 percent iron.

A third product was prepared in a similar manner except that 45 grams of phenol were used in place of resorcinol. This product contained 11.9 percent sulfonate sulfur, 2.6 percent chromium, and 0.6 percent iron.

These products were tested as drilling mud additives in a manner described above. The results obtained are shown in the table below.

|  | Shear lbs./100 sq. ft. | Initial gel | Plastic viscosity | Yield | 10 min. gel | Water loss |
|---|---|---|---|---|---|---|
| *Weighted mud after 22 hours at 475° F., 11#/bbl. additive* | | | | | | |
| Cr Fe lignosulfonate salt phenolated with 25% resorcinol and sulfonated | 591 | 6.0 | 69.0 | 22.5 | 84.5 | 8.2 |
| Cr Fe lignosulfonate salt phenolated with 45% resorcinol and sulfonated | 616 | 20.5 | 76.0 | 23.5 | 93.5 | 9.6 |
| Cr Fe lignosulfonate salt phenolated with 45% phenol and sulfonated | 298 | 2.5 | 55.0 | 11.0 | 36.0 | 10.4 |
| *Sea water mud after hot roll, 5#/bbl. additive* | | | | | | |
| Cr Fe lignosulfonate salt phenolated with 25% resorcinol and sulfonated | | 1.5 | 8.0 | 5.0 | 16.0 | 16.6 |
| Cr Fe lignosulfonate salt phenolated with 45% resorcinol and sulfonated | | 1.0 | 6.5 | 2.0 | 2.0 | 16.9 |
| Cr Fe lignosulfonate salt phenolated with 45% phenol and sulfonated | | | 7.5 | 2.0 | 11.0 | 17.0 |

Among the surprising features of the present invention is that the sulfonation-phenolation treatment described herein is effective to produce significant improvement in high temperature stability in sulfonated phenolated lignosulfonate salts of chromium. Salts of iron, copper, and aluminum do not respond to the same extent. No explanation for the selective improvement of the chromium salt of lignosulfonate by sulfonation and phenolation according to the present invention is apparent. Such selective improvement does, however, emphasize the complexity of lignosulfonate chemistry generally and particularly insofar as it is concerned with improving the properties of drilling fluids.

The drilling fluid tests described in the foregoing examples were performed in accordance with API specifications. The shear tests were conducted according to the procedure disclosed for the determination of shear strength of high temperature aged mud in Section 900 of a Drilling Mud Data Book distributed by Baroid Division of National Lead Company. The tests were made by measuring the depth of penetration obtained with a weighted shear tube and determining the shear from the penetration. It is noted that shear values in excess of 300 are generally indicative of substantial difficulty in pumping the drilling fluid with conventional pumping equipment. However, the shear data set forth in the foregoing examples must necessarily be considered in conjunction with the remaining drilling fluid properties. Thus, shear data is included herein as useful in context with the remaining data.

While the drilling fluid compositions of the present invention have been disclosed as containing sulfonated, phenolated lignosulfonates, it is to be understood that the precise chemical structure of the thinner is not known and it may well be that some change in the molecular arrangement may be obtained other than the simple reaction of sulfonation and phenolation.

The thermal stability of a given lignosulfonate may, of course, be increased to varying degrees by varying degrees of treatment according to the present invention. However, the extent to which such a treatment is desired in a given instance will require only routine experimentation for determination to achieve the desired increase in thermal stability, given the teachings of the present disclosure.

What is claimed is:

1. A method of drilling a well comprising circulating in the well, while drilling, at a temperature above 250° F., a water base well drilling fluid comprising an aqueous medium containing a clay material and an effective dispersing amount of a water-soluble, sulfonated, phenolated-lignosulfonate chromium salt, said lignosulfonate being phenolated by reacting the lignosulfonate with a phenol selected from the group consisting of phenol, cresol, xylenol, catechol, resorcinol, hydroquinone and naphthol and sulfonated by reacting the phenolated lignosulfonate with a hexavalent sulfur sulfonating agent, said phenolation and sulfonation being sufficient to substantially improve the stability of said salt at said temperature.

2. A process according to claim 1 wherein the lignosulfonate is reacted with a phenol selected from the group consisting of phenol, cresol, xylenol, catechol, resorcinol, hydroquinone, and naphthol at a temperature from room temperature to about 180° C.

3. A process according to claim 1 wherein said salt also contains a metal ion selected from the group consisting of iron, aluminum, copper, and mixtures thereof.

4. A process according to claim 1 wherein the phenolated-lignosulfonate is phenolated spent sulfite liquor.

5. A process according to claim 4 wherein the phenol is phenol.

6. A process of drilling a well comprising circulating in the well, while drilling, at a temperature above 250° F., a water base well drilling fluid comprising an aqueous medium containing a clay material and an effective dispersing amount of a water-soluble, sulfonated, phenolated-lignosulfonate salt of chromium as an additive prepared by reacting a lignosulfonate with a phenol, selected from the group consisting of phenol, cresol, xylenol, catechol, resorcinol, hydroquinone and naphthol, at a temperature of from about room temperature to 180° C. to obtain a product having at least 5 weight percent of phenol condensed with the ligosulfonate, sulfonating the lignosulfonate with a hexavalent sulfonating agent to the extent of increasing the sulfonate sulphur content of the product by at least 25 percent and reacting said lignosulfonate with a chromium compound to obtain a salt containing from about 1 to 10 weight percent of chromium.

7. A process according to claim 6 wherein the lignosulfonate is a spent sulfite liquor.

8. A process according to claim 7 wherein the chromium is present in an amount of about 2 to 6 weight percent.

9. A process according to claim 7 wherein the spent sulfite liquor is phenolated with phenol to obtain from 10 to 25 weight percent of phenol condensed with the spent sulfite liquor and wherein the phenolated spent sulfite liquor is sulfonated to a sulfonate sulfur content of from 5 to 15 weight percent with a sulfonating agent selected from the group consisting of sulfuric acid, sulfur trioxide, chlorosulfonic acid, and mixtures thereof.

10. A process according to claim 7 wherein the spent sulfite liquor is reacted with from 20 to 60 weight percent of a phenol, selected from the group consisting of phenol, cresol, xylenol, catechol, resorcinol, hydroquinone, and naphthol, based upon the spent sulfite liquor solids for from ½ to 24 hours at a temperature in the range of 80° C. to 180° C., and the reaction mixture sulfonated until the product has a sulfonate sulfur content of from 8 to 15 weight percent.

11. A process according to claim 10 wherein the sulfonating agent is sulfuric acid.

12. A water-base drilling fluid composition comprising a suspension of clay material in an aqueous medium containing an effective dispersing amount of a water-soluble chromium salt of sulfonated phenolated-lignosulfonate said phenolated lignosulfonate containing at least 5 weight percent of a phenol, selected from the group consisting of phenol, cresol, xylenol, catechol, resorcinol, hydroquinone and naphthol condensed with the lignosulfonate, and said phenolated lignosulfonate being sulfonated with a hexavalent sulfur sulfonating agent.

13. The composition of claim 12 wherein the lignosulfonate is phenolated at a temperature of from 80 to 180° C.

14. The composition of claim 12 wherein the sulfonating agent is selected from the group consisting of sulfuric acid, sulfur trioxide, chlorosulfonic acid and mixtures thereof.

15. The composition of claim 12 wherein the phenolated lignosulfonate is phenolated spent sulfite liquor.

16. The composition of claim 12 wherein said phenol is phenol.

17. The composition of claim 12 wherein said salt also contains a metal ion selected from the group consisting of iron, aluminum, copper and mixtures thereof.

References Cited

UNITED STATES PATENTS

| | | | |
|---|---|---|---|
| 1,143,714 | 6/1915 | Knight | 260—124 |
| 2,099,717 | 11/1937 | Mannheim | 260—17.5 |
| 3,095,392 | 6/1963 | Herrick | 260—17.5 |
| 3,214,373 | 10/1965 | Adolphson | 252—8.5 |
| 3,388,061 | 6/1968 | Markham | 252—8.5 |

HERBERT B. GUYNN, Primary Examiner

U.S. Cl. X.R.

252—353; 260—17.5, 124 A